HIGH-INTENSITY SONIC GENERATOR

Filed June 21, 1950 3 Sheets-Sheet 1

Inventors,
Gordon C. Seavey,
Caperton B. Horsley,
by W. R. Hulbert
Atty.

Inventors,
Gordon C. Seavey,
Caperton B. Horsley,
by W. R. Hulbert
Att'y.

Aug. 26, 1952 G. C. SEAVEY ET AL 2,608,391

HIGH-INTENSITY SONIC GENERATOR

Filed June 21, 1950 3 Sheets-Sheet 3

Inventors,
Gordon C. Seavey,
Caperton B. Horsley,
by W. R. Hulbert
Att'y.

Patented Aug. 26, 1952

2,608,391

UNITED STATES PATENT OFFICE 2,608,391

HIGH-INTENSITY SONIC GENERATOR

Gordon C. Seavey, Arlington, and Caperton B. Horsley, Westwood, Mass., assignors to Sonic Research Corporation, Boston, Mass., a corporation of Massachusetts Application June 21, 1950, Serial No. 169,344

16 Claims. (Cl. 259—1)

This invention relates to devices for the generation of high intensity sound in fluid materials in order to affect the characteristics of the materials in various ways. More specifically the apparatus of the invention is suited for the production of high intensity sound at high frequencies in an enclosure constituting a fluid treating chamber.

Heretofore attempts to produce very high sound intensities at high frequencies have been confined to the use of piezoelectric or magnetostrictive equipment wherein vibrations are induced in a piezoelectric crystal or a magnetostrictive rod by electrical means. Such equipment is limited in its available power by the tendency of the vibrating elements to fracture at high sound pressure levels, and by the relatively low efficiency of conversion of electrical into accoustical power.

It is, therefore, a specific object of our present invention to overcome these difficulties by producing high intensity sound at high frequencies by mechanical means.

It is a further object to devise such equipment in a form which is relatively compact and free from undue stresses on the moving parts.

It is a further object to provide apparatus for subjecting liquids to high intensity sound treatment in a continuous flow arrangement.

A still further object of the invention is to provide new and improved means for carrying out sonic treatment in a resonant chamber so constructed that the effects which occur in different localized areas of the chamber may be readily distinguished.

According to the general plan of the invention a relatively thin disk-like cylindrical member of steel or other rugged vibration conducting material having a cylindrical cavity, forming a fluid treating chamber, disposed along its axis, is vibrated in a radial direction by a mechanism contacting its periphery. The alternate radial expansions and contractions of the cylindrical member caused by the vibrating mechanism focus toward its center in radially symmetric fashion, and these vibrations pass into the liquid material in the central treating chamber as sound waves.

A preferred mechanism for vibrating the cylindrical member comprises a row of uniform rollers disposed about the periphery of the member and adapted to roll in a race over its outer surface, held in place by an outer concentric resilient member compressively surrounding the rollers and having an inwardly facing race for the same. One of the races is constituted in such a way as to present a surface of periodically varying resiliency to the rollers so that relative movement in a radial direction between said members will result as said rollers travel in said races when one of the members is rotated.

We have found that a suitable race presenting such a surface of periodically varying resiliency may be obtained in a number of ways. In one form of the invention the result is achieved by providing the inner cylindrical member with a series of uniform parallel longitudinal grooves in its periphery, the grooves being parallel to the axis of the disk. A thin resilient shim is placed over the grooves and the rollers are adapted to be held compressively against the shim by the outer resilient member. The shim is alternately flexed and released as the rollers periodically pass over the grooves, thus causing alternate expansion and contraction of the outer resilient member with attendant production of inwardly directed vibrations in the inner cylindrical member.

It is evident that in this form of the invention the grooves might with like result be formed in the inner surface of the outer resilient member and the resilient shim placed inwardly thereof in contact with the rollers.

In another embodiment of the invention we achieve the desired result by providing a series of uniform cylindrical cavities just beneath the roller engaging surface of one of the races. As the rollers move under compression along the surface under which are located the cavities, the resilient material in the areas between the cavities and the rollers yields slightly, because of the cavities, and, again, radially symmetrical vibrations are produced in the cylindrical member.

Still a third form of the invention involves the use of two series of rollers separated by a thin resilient shim. One set of rollers engages the outer surface of the cylindrical inner member and the other set of rollers is held compressively against the shim by the outer resilient member. Here again, rotation of either member will cause each of one set of rollers alternately to pass opposite a corresponding roller of the other set and then opposite an interval between two rollers of the other set, thus periodically flexing the shim at uniformly spaced locations all the way around the central cylindrical member and producing vibrations exactly as described in connection with the other embodiments.

Preferably we choose the resilient materials and the dimensions thereof in such a way as to form a resonating system in which the centrally focusing vibrations will be produced with maximum efficiency. A standing wave pattern is produced in the central treating chamber, with pressure maxima at the outer wall and the center of the chamber, and a velocity maximum intermediate thereof. The outer resilient race member preferably has displacement maxima at both its inner and outer surfaces and a pressure maximum occurs at or near the outer periphery of the cylindrical vibration conducting member. In order to achieve this effect, the distance between the outer surfaces of the two concentric members should be approximately ¾ wave length of sound in the material used, and the distance from the outer wall of the treating chamber to the periphery of the vibration conducting inner member should be approximately one wave length.

These and other features, advantages and objects of the invention may be more readily understood with reference to the accompanying drawings of a preferred embodiment thereof, selected for purposes of illustration only, in which like numerals refer to like parts in the several views, and in which.

Figure 1:
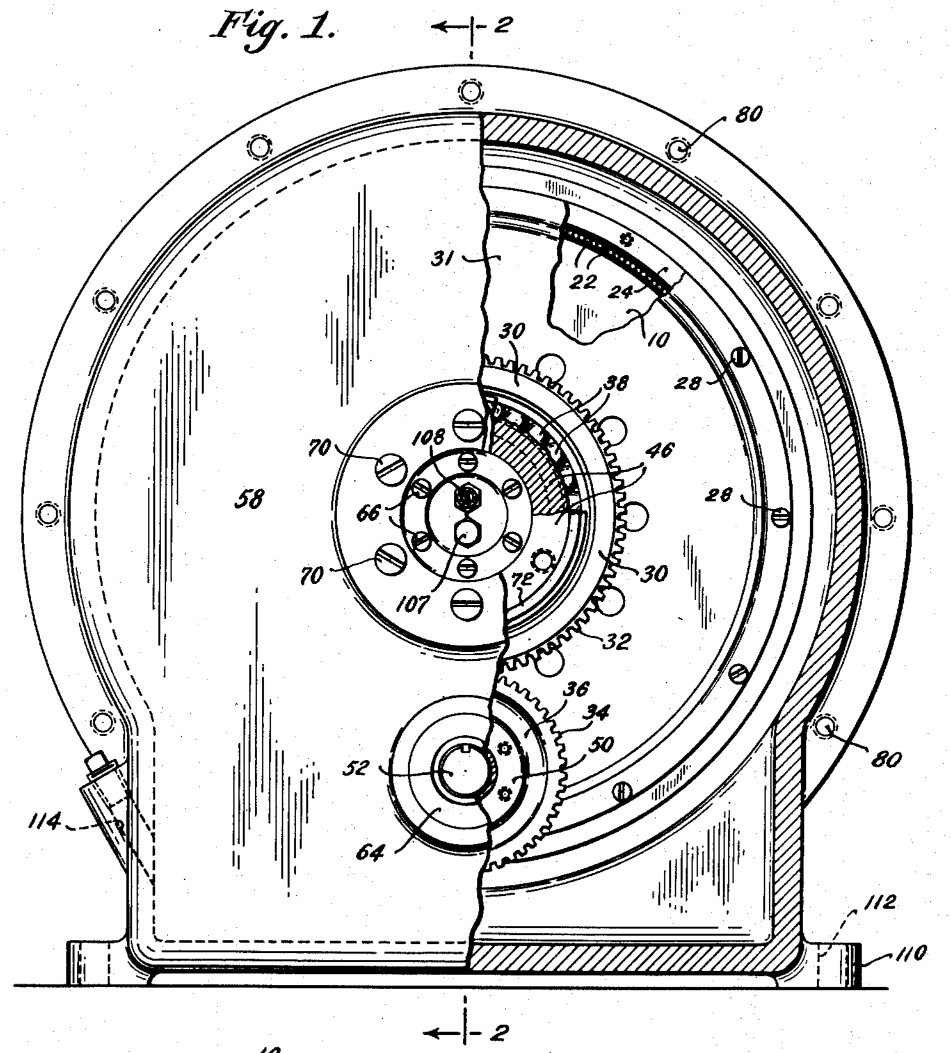
Fig. 1 is an end view, partly in section on line 1—1 of Fig. 2, of a high intensity sound generator according to the present invention.
Figure 2:
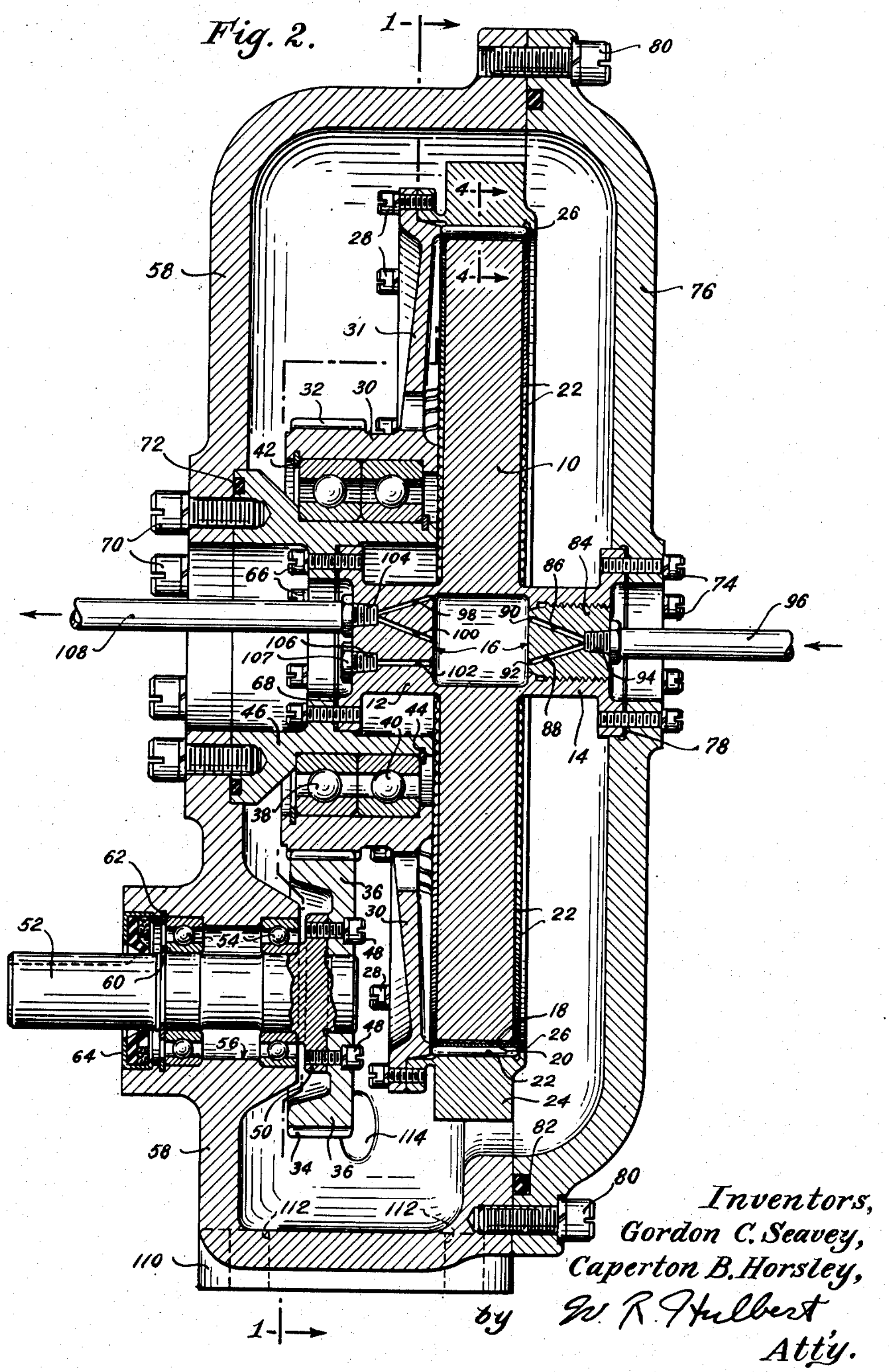
Fig. 2 is a sectional view taken along line 2—2 of Fig. 1.

Referring first to Figs. 1 and 2, there is shown a sound generator, according to the invention, including a disk-shaped or inner cylindrical member 10, with projecting hubs 12 and 14 and a cylindrical chamber 16 lying along the central axis passing perpendicularly through the disk. The member 10 is composed of rugged vibration conducting material such as steel.

Figure 4:
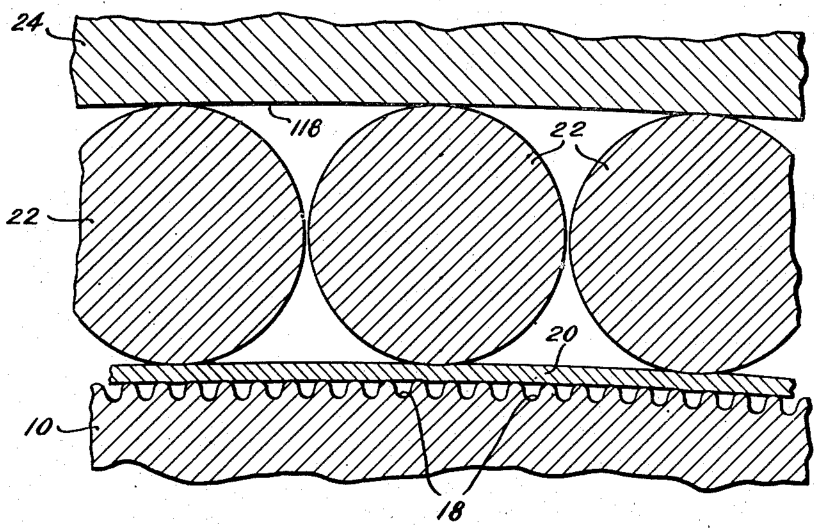
Fig. 4 is a detail view on line 4—4 of Fig. 2 showing one form of the vibration producing elements of the apparatus.

The periphery of the member 10 is provided with a continuous series of grooves 18 (as best seen in Fig. 4) parallel to the central axis, over which there is laid a thin resilient annular shim 20, maintained compressively in place by shrinkage upon the assembly. A row of uniform cylindrical rollers 22 travels on the outer surface of the shim 20. An annular resilient member 24 providing an inwardly facing race and having a projecting flange 26 is shrunk over the rollers and compressively maintains the same against the shim 20.

The resilient annular race 24 is fastened by a series of machine screws 28 to the driving hub 30, which is in the shape of a cylinder with a disk-shaped flange 31, slightly concave in the direction of the disk-shaped member 10. One portion of the periphery of the driving hub 30 is provided with gear teeth 32 which mesh with corresponding teeth 34 in the drive gear 36. Ball bearings 38 and 40 held in place by snap rings 42 and 44, maintain the driving hub 30 in spaced rotatable relation to the tapered cylindrical positioning stud member 46.

The driving gear 36 is fastened by machine screws 48 to a flange 50 on drive shaft 52 actuated by conventional means not shown. This shaft is rotatably located by ball bearings 54 in a bossed hole 56 in the housing 58. Snap rings 60 and 62 position the outer bearing, and snap ring 60 also serves to restrain the shaft 52 from motion along its axis. An oil seal assembly 64 surrounds the shaft at the outer boss.

The hub portion 12 of member 10 is fastened by machine screws 66 to a flange of the positioning stud 46, located on which is a gasket 68. This stud 46 is fastened in turn to the housing 58 with screws 70 in such a position as to form a cylindrical recess concentric with the axis of symmetry of member 10. A circular rubber O ring 72 seals the joint between stud member 46 and the inner face of housing 58.

The hub portion 14 of disk 10 is fastened by screws 74 passing through a boss in the cover plate 76, and the joint is sealed with a gasket 78. The cover plate is fastened by screws 80 passing through its peripheral flange, securing it against a corresponding flange on the housing 58. A rubber O ring 82 seals this joint between the flanges.

The hub portion 14 is further provided with a threaded plug 84 having liquid-conducting openings 86 and 88 which terminate in needle orifices 90 and 92 leading into the cylindrical treating chamber 16. The outer ends of the ducts 86 and 88 pass into a threaded recess 94 in plug 84 designed to receive a liquid-conducting tube or pipe 96. The plug 84 may be inserted and removed by conventional means, such as a spanner wrench.

Figure 3:
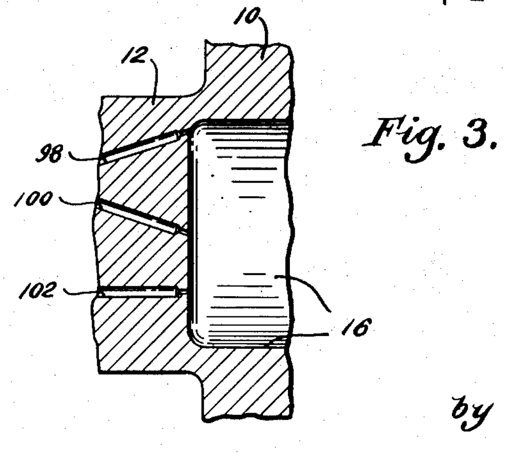
Fig. 3 is a detail of a portion of the cylindrical treating chamber of the device.

As best seen in Fig. 3, the limb portion 12 of member 10 is provided with liquid-conducting openings 98, 100 and 102, similar to ducts 86 and 88 in plug 84. The ducts 98 and 100 both start from the threaded recess 104, and terminate in needle orifices in the chamber 16; duct 102 starts from the threaded recess 106 which is closed by a plug 107 when not in use, and terminates in a needle orifice in the chamber 16. The recesses 104 and 106 are adapted to receive tubes 108, only one of which is shown. The arrangement is such that liquids may be flowed through the chamber 16 in continuous fashion, by means of the tubes or pipes 96 and 108 screwed into the recesses 94, 104 and 106. As later explained, the inner openings of the conduits 86, 88, 98, 100 and 102, are so placed that by employing one or more of them selectively advantage may be taken of the resonant characteristics of the chamber 16.

The entire assembly is mounted on any suitable support by attachment to the flange portion 110, which is provided with mounting holes 112. The interior of the generator, during operation, is kept filled with lubricating oil which may be added or withdrawn through the oil filling hole 114 in the housing 58.

In the operation of the embodiment shown in Figs. 1–4, as the shaft 52 is turned by the drive motor (not shown), the rotating race member 24 is driven at a speed determined by the speed of the motor and the gear ratio between the gear teeth 32 on the driving hub 30 and the gear teeth 34 on the drive gear 36. As the rotating race 24 is turned, the cylindrical rollers 22 roll between the inner surface 118 of the race 24 and the surface of the thin resilient shim 20, which lies over the axially aligned grooves on the periphery of member 10.

Whenever the rollers 22 are aligned radially over the center of grooves 18, the thin resilient shim 20 deflects slightly, and the outer rotating race 24 contracts slightly toward its axis of rotation. Conversely, whenever the rollers 22 are aligned radially above the peaks intermediate the grooves, the shim 20 cannot deflect, and the rotating race 24 is caused to expand slightly in radially symmetrical fashion.

Since the entire assembly of rotating race, rollers, shim, and disk-shaped member 10 is held together compressively by the race member 24, the alternate expansions and contractions of the rotating race 24 are transmitted through the rollers 22 and the resilient shim 20 to the periphery of the disk member 10, with a force impulse being directed inwardly whenever the rollers are aligned over the peaks between the grooves. These force impulses are applied simultaneously around the periphery of the member 10, and the alternate compressions and relaxations are radiated into the disk member 10 where they focus down to the central liquid treating cavity 16.

In effect, the outer surface of the shim 20 presents a surface of periodically and uniformly varying resiliency along its extent. The radially symmetrical vibrations which result as the rollers travel over the resilient shim 20 constitute vibrations which are radiated toward and converge at the center of the disk-shaped member 10 and appear as sound waves in the chamber 16. The frequency of these sound waves is determined by the speed of rotation of the outer race 24, the size of the rollers 22, and the spacing of the grooves 18 in the member 10. The intensity may be varied by varying the depth of the grooves 18, for example.

Figure 5:
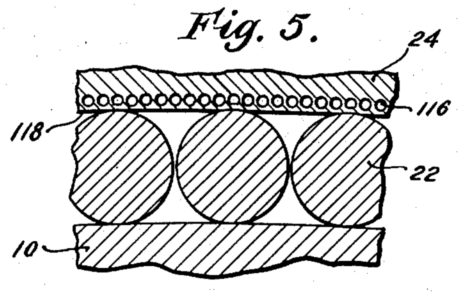
Figs. 5, 6 and 7 show alternative forms of vibration producing elements.
Figure 6:
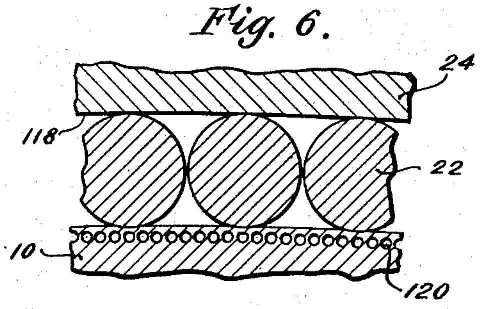
Figure 7:
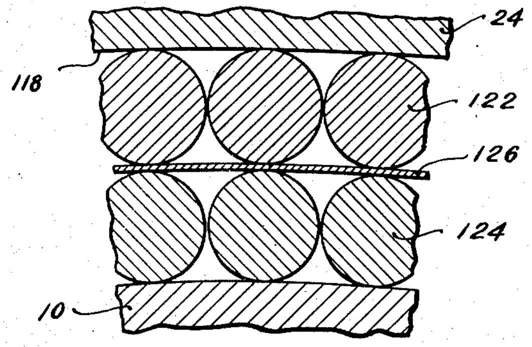

Turning now to the modifications of the invention disclosed in Figs. 5, 6 and 7, it will be seen that there are illustrated alternative vibration producing assemblies which may be substituted for that shown in Fig. 4.

In Fig. 5 the rotating race 24 has been provided with a series of cavities closely spaced from its inner surface 118. The shim member 20 has been eliminated and the rollers 22 roll between outer surface of the disk 10 and the inner surface of the outer race 24. As the rollers pass directly opposite openings 116, the surface 118, of periodic varying resiliency because of the openings, flexes slightly, and then returns to normal position as the rollers move on to points opposite the intervals between the openings 116. In this case the cavities 116 are dimensioned and spaced with reference to the dimensions of the rollers 22, so that the entire surface 118 will be flexed and all the rollers vibrate in unison, thus producing symmetrical centrally converging sound waves in the same manner as shown in Fig. 4.

Fig. 6 is similar to Fig. 5 except that a series of cylindrical openings 120 has been provided in the disk member 10 instead of in the race member 24. The operation of the embodiment of Fig. 6 is the same as that of the embodiment of Fig. 5.

Still another alternative vibration producing assembly is illustrated in Fig. 7, where two series of rollers 122 and 124 have been provided between the moving race 24 and the disk 10, separated by a resilient shim 126. In this case when the outer rate 24 is driven the rollers 122 will roll upon the surface of the shim 126, flexing the same at the time when the rollers 122 are opposite the intervals between the rollers 124, and permitting the same to return to normal unflexed position when the two sets of rollers are diametrically opposed to each other. Here again the periodic flexing caused by the rolling of rollers 122 creates intense vibrations which converge on the treating chamber 16 axially disposed in the disk 10, the frequency being determined primarily by the size and speed of the rollers.

It will be evident that the embodiment of Fig. 4 may readily be modified by reversing the position of the grooves 18 and shim 20 to include them upon the inner surface 118 of the race 24. Furthermore, it will be observed that vibrations may be produced by driving either the disk 10 or the race 24, so long as the moving rollers are held in compressed relation against a surface of periodically varying resiliency and fluid to be treated can reach the treating chamber.

There are a number of advantages in the arrangement of parts of the sound generator according to the invention which may be most easily understood with reference to Fig. 2. It will be seen that the disk-shaped member 10, the rotating race 24, and the resilient shim and rollers are shown in cross-section.

It has been pointed out above that the sound waves created by the rolling of the rollers 22 over the shim 20 are focused toward the central treating chamber 16 in radially symmetric fashion. Now, except for losses due to absorption of sound in the material of the member 10, the amount of energy in the form of sound waves which traverses any circle drawn about the central axis of the chamber is essentially constant. Therefore, the amount of energy per unit area which crosses the wall of the treating chamber is greatly increased over the amount per unit area at the shim surface where the sound waves are generated. This focusing effect makes it possible to build up very high sound pressures in the chamber 16 without stressing the rollers 22 to an undue extent.

To take an example, suppose that the circumference at the outer surface of shim 20 is ten times the circumference of the treating chamber 16. Then the energy density, or amount of sound energy per unit area of surface, is ten times higher at the chamber walls than it is at the outer surface of shim 20. The corresponding ratio of peak sound pressures is $\sqrt{10}$:1; or, otherwise stated, the peak sound pressures which may be produced at the walls of chamber 16 are somewhat more than three times as high as those which must be withstood by the vibration producing elements.

The use of a large number of rollers disposed about the outer surface of the shim 20 means, in addition, that each roller bears a relatively small portion of the total load which occurs at that surface, and the load per roller may be decreased to whatever value is tolerable by increasing the radius of the disk-shaped member 10. Specifically, since the number of rollers used increases as the radius, and the pressure decreases as the square root of the radius, this means that the load per roller decreases as the $\frac{2}{3}$ power of the radius. Thus the dimensions of the parts of a specific machine may be readily determined to conform with the strength of the construction materials used.

Further to illustrate the frequencies and sound intensities which may be generated by apparatus according to Figs. 1–4, suppose the undercut grooves are spaced approximately .016″ from ridge to ridge, or valley to valley. To obtain 50,000 C. P. S. (cycles per second), a roller must travel .016″ in $\frac{1}{50,000}$ second. Thus the roller speed must be 50,000×.016″, i. e. 800 inches per second or 4000 feet per minute. At this peripheral speed roller bearings $\frac{1}{8}$″ in diameter and 1″ long should operate satisfactorily with peak loads as high as 200 pounds per roller. High quality bearing practices are required by this combination of speed and peak load and the races and rollers must be accurately ground and effectively lubricated and cooled according to good engineering practice.

Since there are approximately eight rollers per inch, the rollers will be able to exert peak pressures on the inner race 20 and the outer race 24 of 1600 lb./in.$^2$. The inner race 20, being thin, will transmit this pressure to the inner disk member 10.

The shim 20 being only .008″ thick can be deflected .000,003″ between the .016″ spaced ridges without overstressing. This .000,003″ deflection will be obtained if a roller exerts a 200-lb. pressure on thin race 20, at the center position between ridges.

The race 24 is dimensioned so that it will preload each roller to the extent of approximately 150 lbs., that is a mean pressure on the races of 1200 lb./in.$^2$.

This race 24 is also dimensioned so that, when the compressibility of the rollers is taken into account, the distance from the outside diameter of the shim 20 to the outside diameter of the race 24 represents approximately ¾ wavelength at 50,000 C. P. S. Since the outer surface of race 24 is unrestricted, it will represent the displacement maximum, pressure minimum (pressure node) position. The outer surface of race 20 will be so close to a displacement minimum, pressure maximum position that its peak pressure will, in effect, be a maximum peak sound pressure. Now at 50,000 C. P. S., ¾ of a wavelentgh in steel would ordinarily be about 3″. However, because of the greater elasticity of the bearings as compared to the space between races 20 and 24 being filled with steel, the actual distance between the outside diameters of races 20 and 24 should be close to 2⅛″. Thus, the outer diameter of the race 24 will be at a displacement maximum position, the inner diameter of race 24 will be close to a displacement maximum position, and the outer diameter of the thin race 20 close to a displacement minimum position.

Since the distance from the outside diameter of the cavity 16 to the outside diameter of the disk member 10 is approximately one wavelength at 50,000 C. P. S. (i. e. about 4″), then if the outside diameter of the disk member 10 is approximately at a pressure maximum position the outside diameter of cavity 16 will also be close to pressure maximum position. Because of the ratios of the diameters, if the peak sound pressure at the outside diameter of the disk is ±400 p. s. i., the peak sound pressure at the outside diameter of the chamber 16 will be approximately ±1600 p. s. i. Because of geometrical considerations this ±1600 p. s. i. at the outside diameter of the chamber should produce peak sound pressures in the order of ±10,000 p. s. i. in the liquid in the region near the center line of the chamber, if the absorption of sound in the liquid is not excessive.

The advantages appearing in the foregoing discussion, namely, the "focusing" effect and the distribution of load on the moving parts, as well as the use of rollers engaging a thin resilient or other surface of periodically varying resiliency as shown make it possible to produce by mechanical means sonic vibrations at high frequencies and high intensities in relatively simple and rugged equipment, free of the load limitations characteristic of high-speed bearings, for example.

The transfer of the sonic vibrations produced by the apparatus of our invention into the liquid undergoing treatment is carried out in such a way that advantage may be taken of the resonant characteristics of the central treating chamber 16. The walls of the chamber are caused to vibrate uniformly and symmetrically, and as the vibrations focus to the center, there will be a peak of intense oscillating pressure in the center, along the axis of the treating chamber. As the liquid in the chamber resonates, there will be other regions of relatively little pressure variation, although at these regions, there will be a high degree of acceleration of the liquid.

In order to make it possible to study the effects which may be produced at different locations in the resonant chamber, and in order to make it possible to operate on a continuous flow basis, the liquid flow tubes 86, 88, 98, 100 and 102 have been directed toward different portions of the chamber 16, and have been provided with needle orifices at their points of entry therein.

Thus the tubes 86, 88 and 102 enter the chamber at locations where it is expected that there will be relatively little pressure variation, but high acceleration, during the resonant condition. Flow may be controlled through these ducts, with tubes 98 and 100 closed off, when it is desired to study the primarily accelerative treatment of liquid samples.

The ducts 98 and 100 enter at regions of high pressure variation during resonance, which occur at the walls and the center of the chamber 16. The use of the needle orifices in these tubes, as well as in the others, means that the pressure per unit area at the orifices will be high enough, even with a relatively low head in the fluid feed pipes, to overcome the oscillating pressures set up in the chamber, and none of the treated fluid will be pumped out. During treatment in which the effects of pressure are to be studied, liquid is introduced through the conduits 86 and 88 at points of minimum pressure to reduce losses of sonic energy, and withdrawn through ducts 98 and 100.

This arrangement of liquid flow tubes and orifices in the apparatus of our invention makes it possible to achieve high intensity and high frequency sonic treatment of fluids on a continuous flow basis, and to isolate the effects which occur at localized regions where conditions may differ widely from those in closely adjacent regions.

The precise number of tubes used, and the size of the needle orifices, may of course be changed in some details without departing from the spirit of the invention. Likewise, certain of the details of construction may be modified in ways readily occurring to those skilled in the art without departing from the scope of the invention as pointed out in the following claims.

Reference is made to our copending application Ser. No. 179,711, filed August 16, 1950, owned by the same assignee, for related sonic generators.

Having thus described our invention, what we claim as new and desire to secure by Letters Patent is:

1. An apparatus for the high intensity sonic treatment of fluid materials comprising a disk-shaped member with a cylindrical cavity passing centrally therethrough, means for passing fluids through said cavity, mechanical means for imparting vibrations to the periphery of the said disk-shaped member, which vibrations are in phase with each other and in the plane of said member and imparted at intervals uniformly spaced about its periphery, and driving means to activate the said vibration-producing means.

2. A high intensity sound generator for sonic treatment of fluid materials which comprises a sound conducting member having a symmetrical curved outer surface and a fluid treating chamber located generally at its center of symmetry, and mechanical means for imparting impulses at a sonic frequency to said surface at a plurality of spaced locations over its area which impulses are in phase with each other and converge through said member on said chamber.

3. Apparatus for the high intensity sonic treatment of fluid materials which comprises a cylindrical vibration conducting member having a fluid treating chamber at its center and an outwardly facing roller accommodating race on its periphery, a row of uniform rollers disposed about the periphery of said cylindrical member to roll in said race, and an outer resilient member compressively surrounding said rollers and having an inwardly facing race for the same, one of said members being rotatable for causing rolling movement of said rollers and one of said races presenting to said rollers a surface of periodically varying resiliency for producing rapid alternate radial expansions and contractions of said resilient member as said rollers travel in said races thereby generating in said cylindrical member a series of vibrations converging radially on said chamber to create an intense sound field therein.

4. Apparatus for the high intensity sonic treatment of fluid materials which comprises a cylindrical vibration conducting member having a fluid treating chamber at its center and an outwardly facing roller accommodating race on its periphery, a row of uniform rollers disposed about the periphery of said cylindrical member to roll in said race, and an outer resilient rotatable member compressively surrounding said rollers and having an inwardly facing race for the same, one of said races presenting to said rollers a surface of periodically varying resiliency for producing rapid alternate radial expansions and contractions of said resilient member during rotation thereof as said rollers travel in said races thereby generating in said cylindrical member a series of vibrations converging radially on said chamber to create an intense sound field therein.

5. Apparatus according to claim 4 in which the one of said races presenting said surface of periodically varying resiliency comprises a thin resilient shim one side of which engages one of said members and the other side of which forms said surface, the shim engaging portion of said last named member being provided with a series of uniform grooves facing said shim and parallel with both each other and the axis of said cylindrical member, said shim being adapted to be flexed when said rollers pass opposite said grooves.

6. Apparatus according to claim 4 in which the one of said races presenting the surface of periodically varying resiliency is formed by the provision of a series of cavities in said race beneath the roller contacting surface thereof.

7. Apparatus according to claim 4 in which the one of said races presenting said surface of periodically varying resiliency comprises a resilient shim and a second row of uniform rollers, said second row of rollers being disposed between said members concentrically with said first named row and separated therefrom by said shim, the side of said shim engaging said first named row of rollers constituting said surface and said shim being adapted to be flexed when rollers of said first named row pass opposite the intervals between the rollers of said second row.

8. In apparatus for the high intensity sonic treatment of fluids the combination comprising a cylindrical vibration conducting member having a cylindrical fluid treating chamber at its center and a series of uniformly spaced peripheral grooves parallel to its axis, a thin resilient shim surrounding said disk and covering said grooves, a series of uniform rollers arranged to roll on said shim, and a resilient rotatable outer race member holding said rollers compressively in rolling engagement with said shim thereby causing said rollers and outer race member to vibrate in unison toward and away from said cylindrical member with the alternate flexing and releasing of said shim as said rollers pass over said grooves to produce a series of vibrations in said cylindrical member converging radially on said chamber.

9. Apparatus according to claim 8 in which the dimensions of the several parts are so chosen that the resulting mode of vibration will produce displacement maxima at about both the inner and outer surfaces of said outer race member, and pressure maxima at about the outer surface of said shim and at the cylindrical wall and center of said treating chamber.

10. Apparatus according to claim 9 in which the distance from said cylindrical wall of said chamber to the periphery of said vibration conducting member will be about one wave length and the distance from the outer surface of said shim and the outer surface of said outer race member will be about ¾ wave length.

11. Apparatus for the high intensity sonic treatment of fluid materials which comprises a stationary cylindrical vibration conducting member having a cylindrical fluid treating chamber at its center and an outwardly facing roller accommodating race on its periphery, a row of uniform rollers disposed about the periphery of said cylindrical member to roll in said race, an outer resilient member compressively surrounding said rollers and having an inwardly facing race for the same, said resilient member being rotatable for causing rolling movement of said rollers and one of said races presenting to said rollers a surface of periodically varying resiliency for producing alternate expansions and contractions of said resilient member as said rollers travel in said races thereby generating in said cylindrical member a series of vibrations converging radially on said chamber whereby fluid material in said chamber will be caused to resonate and inlets and outlets for said chamber having openings therein at points of velocity and pressure maxima therein.

12. Apparatus for the high intensity sonic treatment of fluid materials which comprises inner and outer symmetrical vibratable members concentric with each other and having mutually facing roller receiving races, a row of uniform rollers disposed to travel in said races between said members, said outer member resiliently compressing said rollers against said inner member, and a driving device for rotating said outer member about said inner member, one of said races presenting to said rollers a surface of periodically varying resiliency for producing alternate expansions and contractions of said outer member during rotation thereof as said rollers travel in said races, thereby generating in said inner member a series of vibrations converging radially toward its center, and said inner member having a resonating fluid treating chamber at its center of symmetry upon which said vibrations are focussed.

13. Apparatus for the high intensity sonic treatment of fluid materials comprising a solid disk of sound conducting material having a central cavity forming a fluid treating chamber and a vibratory mechanism surrounding said disk and engaging the periphery thereof for mechanically imparting vibrations at a predetermined operating frequency to the same simultaneously at a plurality of spaced locations about its circumference, which vibrations are in phase with each other and in the plane of said disk and converge through said disk upon said cavity.

14. Apparatus for the high intensity sonic treatment of fluid materials comprising a solid disk of sound conducting material having a central cavity forming a fluid treating chamber, a vibratory mechanism surrounding said disk and engaging the periphery thereof for mechanically imparting vibrations at a predetermined operating frequency to the same simultaneously at a plurality of locations uniformly spaced about its circumference, which vibrations are in phase with each other and in the plane of said disk and converge through said disk upon said cavity, and inlets and outlets for said chamber for supplying fluid thereto and withdrawing fluid therefrom for purposes of treatment.

15. Apparatus in accordance with claim 14 in which said disk, mechanism and cavity are so proportioned with respect to the wave length of sound in the materials thereof that said chamber will resonate at the operating frequency with pressure maxima components in the regions adjacent its walls and at its center and a displacement maximum component in a region therebetween.

16. Apparatus in accordance with claim 14 in which said disk, mechanism and cavity are so proportioned with respect to the wave length of sound in the materials thereof that said chamber will resonate at the operating frequency with pressure maxima components in the regions adjacent its walls and at its center and a displacement maximum component in a region therebetween, said inlets and outlets being selectively located to open into said regions of maximum pressure and maximum displacement.

GORDON C. SEAVEY.
CAPERTON B. HORSLEY.

REFERENCES CITED

The following references are of record in the file of this patent:

UNITED STATES PATENTS

| Number | Name | Date |
|---|---|---|
| 1,120,653 | Russell et al. | Dec. 8, 1914 |
| 1,125,083 | Fitzgerald | Jan. 19, 1915 |
| 1,148,294 | Dean | July 27, 1915 |
| 1,753,412 | Harris | Apr. 8, 1930 |
| 2,163,650 | Weaver | June 27, 1939 |
| 2,228,024 | Abrahams | Jan. 7, 1941 |
| 2,398,455 | Unger | Apr. 16, 1946 |
| 2,490,122 | Glegg | Dec. 6, 1949 |

FOREIGN PATENTS

| Number | Country | Date |
|---|---|---|
| 452,715 | France | May 22, 1915 |